(12) United States Patent
Taniguchi et al.

(10) Patent No.: US 10,809,185 B2
(45) Date of Patent: Oct. 20, 2020

(54) OPTICAL MEASURING DEVICE

(71) Applicant: Ushio Denki Kabushiki Kaisha, Tokyo (JP)

(72) Inventors: Shinji Taniguchi, Tokyo (JP); Kyosuke Yamane, Tokyo (JP); Kenichi Sabatake, Tokyo (JP); Naoki Goto, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 376 days.

(21) Appl. No.: 15/933,053

(22) Filed: Mar. 22, 2018

(65) Prior Publication Data

US 2018/0217052 A1    Aug. 2, 2018

Related U.S. Application Data

(63) Continuation of application No. PCT/JP2016/073992, filed on Aug. 17, 2016.

(30) Foreign Application Priority Data

Sep. 25, 2015 (JP) .................................. 2015-187762

(51) Int. Cl.
*G01N 21/01* (2006.01)
*G01N 21/03* (2006.01)
(Continued)

(52) U.S. Cl.
CPC ................ *G01N 21/31* (2013.01); *B01L 9/06* (2013.01); *G01N 21/01* (2013.01); *G01N 21/255* (2013.01);
(Continued)

(58) Field of Classification Search
None
See application file for complete search history.

(56) References Cited

U.S. PATENT DOCUMENTS 4,609,991 A * 9/1986 Minton .................. G01N 15/04
356/246
6,195,158 B1 * 2/2001 Cadell .................... G01N 15/05
356/246
(Continued)

FOREIGN PATENT DOCUMENTS

JP    H10-073532 A    3/1998
JP    2006-300741 A    11/2006
(Continued)

OTHER PUBLICATIONS

International Search Report issued in PCT/JP2016/073992; dated Nov. 8, 2016.
(Continued)

*Primary Examiner* — Jill A Warden
*Assistant Examiner* — Brittany I Fisher
(74) *Attorney, Agent, or Firm* — Studebaker & Brackett PC

(57) ABSTRACT

An object is the provision of an optical measuring device that can be carried readily due to its reduced size and that can suppress the incidence of light other than detection light upon a light receiving unit and thus can obtain a measurement result with high accuracy. The optical measuring device includes a first light guiding path forming body having therein a first light guiding path formed by a through hole extending linearly for allowing measurement light from a light source to be incident on a measuring position in which a measurement sample is disposed, and a second light guiding path forming body having therein a second light guiding path formed by a through hole extending linearly for guiding detection light having exited from the measuring position to a light receiving unit. In the measuring position, the measurement light is incident and the detection light is exited through a sample bracket having a sample tube receiving hole into which the s sample tube loaded with the (Continued)

measurement sample is inserted. The second light guiding path forming body is formed from a light-absorbing material. Whole of the second light guiding path is formed surrounded by an inner wall surface of the through hole in the second light guiding path forming body. A relational expression (1) described below is satisfied when d represents a diameter of the second light guiding path of the second light guiding path forming body and L represents a length of the second light guiding path of the second light guiding path forming body.

$$3 \leq L/d \leq 15.$$ Relational expression (1):

5 Claims, 4 Drawing Sheets

(51) Int. Cl.
*G01N 21/31* (2006.01)
*B01L 9/06* (2006.01)
*G01N 21/25* (2006.01)

(52) U.S. Cl.
CPC . *B01L 2300/0663* (2013.01); *B01L 2300/123* (2013.01); *B01L 2300/1827* (2013.01); *B01L 2300/1844* (2013.01); *G01N 21/0332* (2013.01); *G01N 2201/0221* (2013.01); *G01N 2201/064* (2013.01); *G01N 2201/08* (2013.01)

(56) References Cited

U.S. PATENT DOCUMENTS

| | | | |
|---|---|---|---|
| 6,992,759 B2* | 1/2006 | Nakayama | G01N 21/0303 250/339.07 |
| 2006/0077390 A1* | 4/2006 | Kralik | G01N 21/03 356/427 |
| 2012/0015445 A1* | 1/2012 | Kellner | G01N 33/1813 436/172 |
| 2012/0288897 A1* | 11/2012 | Ching | B01F 15/0203 435/91.2 |
| 2015/0060700 A1* | 3/2015 | Bjornson | G01N 21/17 250/461.1 |
| 2015/0085282 A1* | 3/2015 | Yoshioka | G02B 1/04 356/318 |

FOREIGN PATENT DOCUMENTS

| | | |
|---|---|---|
| JP | 2014-126529 A | 7/2014 |
| JP | 2015-083962 A | 4/2015 |

OTHER PUBLICATIONS

An Office Action; "Notification of Reasons for Refusal" issued by the Japanese Patent Office dated May 9, 2017, which corresponds to Japanese Patent Application No. 2015-187762.
An Office Action; "Decision of Refusal" issued by the Japanese Patent Office dated Sep. 5, 2017, which corresponds to Japanese Patent Application No. 2015-187762.

* cited by examiner

OPTICAL MEASURING DEVICE

TECHNICAL FIELD

The present invention relates to an optical measuring device. More specifically, the present invention relates to a portable optical measuring device used as, for example, an absorbance measuring device.

BACKGROUND ART

As one type of optical measuring device, Patent Literature 1, for example, discloses an absorbance measuring device configured such that a measurement sample is irradiated with light emitted from a light source, light having transmitted through the measurement sample is collected and reflected by an optical system having a complicated configuration to guide the light to a light receiving unit, and a concentration of a target substance in the measurement sample is measured from an amount of light attenuation.

Such an absorbance measuring device has advantages of having high functionality and being capable of measuring absorbance with high accuracy.

CITATION LIST

Patent Literature

Patent Literature 1: Japanese Patent Application Laid-Open No. 2014-126529

SUMMARY OF INVENTION

Technical Problem

Meanwhile, in the field of life science, there has been a demand, in recent years, for the downsizing of an optical measuring device such as an absorbance measuring device in order to enhance its portability for the purpose of employing such an optical measuring device in point-of-care testing, for example.

In order to downsize the absorbance measuring device as described above, it can be contemplated that the light source and the light receiving unit are disposed close to each other by simplifying an optical system between the light source and a measuring position in which the measurement sample is disposed or between the measuring position and the light receiving unit, for example.

Light emitted from the light source, however, is diverging light. Thus, light other than detection light having transmitted through the measurement sample is reflected and scattered by a wall surface surrounding a light guiding path. Consequently, the light receiving unit is irradiated with not only the detection light having transmitted through the measurement sample and traveled straight but also the light reflected and scattered by the wall surface surrounding the light guiding path. This causes a measurement error, so that a highly-accurate measurement result cannot be obtained.

The present invention has been made in view of the foregoing circumstances and has as its object the provision of an optical measuring device that can be carried readily due to its reduced size and that can suppress the incidence of light other than detection light upon a light receiving unit and thus can obtain a measurement result with high accuracy.

Solution to Problem

According to the present invention, there is provided an optical measuring device including: a first light guiding path forming body having therein a first light guiding path formed by a through hole extending linearly for allowing measurement light from a light source to be incident on a measuring position in which a measurement sample is disposed; and a second light guiding path forming body having therein a second light guiding path formed by a through hole extending linearly for guiding detection light having exited from the measuring position to a light receiving unit.

In the measuring position, the measurement light is incident and the detection light is exited through a sample bracket having a sample tube receiving hole into which the sample tube loaded with the measurement sample is inserted.

The second light guiding path forming body is formed from a light-absorbing material.

Whole of the second light guiding path is formed surrounded by an inner wall surface of the through hole in the second light guiding path forming body.

A relational expression (1) described below is satisfied when d represents a diameter of the second light guiding path of the second light guiding path forming body and L represents a length of the second light guiding path of the second light guiding path forming body.

$$3 \leq L/d \leq 15. \quad \text{Relational expression (1):}$$

In the optical measuring device of the present invention, the second light guiding path of the second light guiding path forming body may preferably be positioned coaxially with the first light guiding path of the first light guiding path forming body.

In the optical measuring device of the present invention, the light-absorbing material may preferably be a light-absorbing elastic body, and the light-absorbing elastic body may preferably be a silicone resin having a light-absorbing substance dispersed therein.

In the optical measuring device of the present invention, an accommodation recesses for accommodating the first light guiding path forming body and the second light guiding path forming body are formed in the sample bracket, and the first light guiding path forming body and the second light guiding path forming body may preferably be held by being pressed into the accommodation recesses, respectively.

In the optical measuring device of the present invention, the first light guiding path forming body may preferably be formed from a light-absorbing material.

Advantageous Effects of Invention

According to the optical measuring device of the present invention, downsizing can be achieved by disposing the light source and the light receiving unit close to each other, and thus the optical measuring device can be carried readily. Furthermore, according to the optical measuring device of the present invention, since the second light guiding path forming body is formed from the light-absorbing material, light other than the detection light is absorbed by a wall surface surrounding the second light guiding path. Thus, the reflection and scattering of such light can be suppressed. Consequently, the optical measuring device of the present invention enables the light receiving unit to be irradiated only with the detection light. Thus, measurement results with high accuracy can be obtained.

DESCRIPTION OF EMBODIMENTS

An embodiment of the present invention will be described below in detail.

Figure 1:
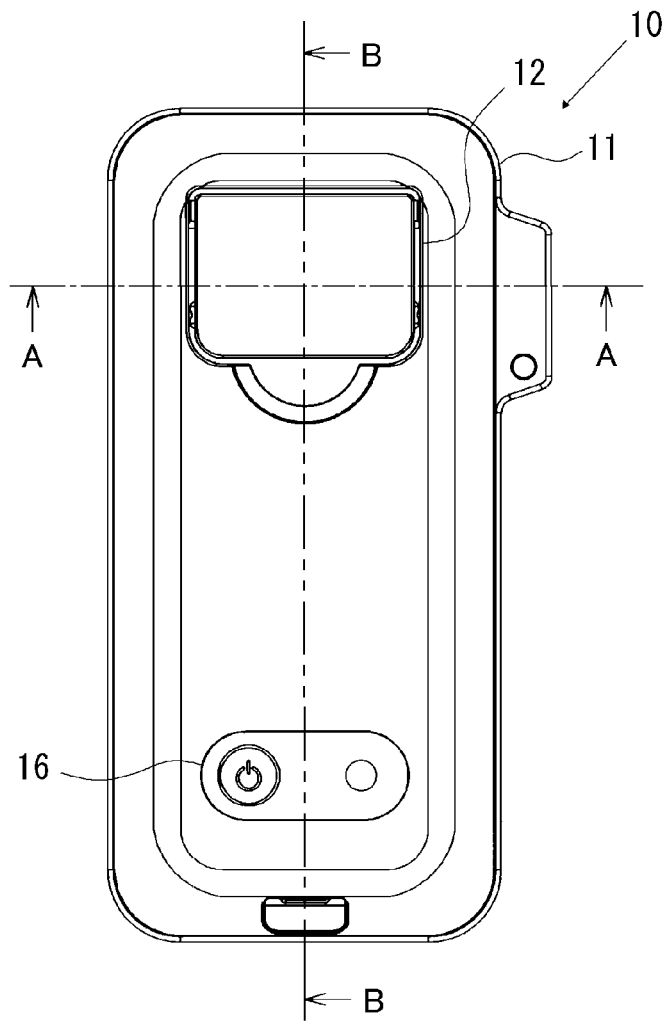
FIG. 1 is a plan view illustrating a configuration example of an optical measuring device of the present invention.
Figure 2:
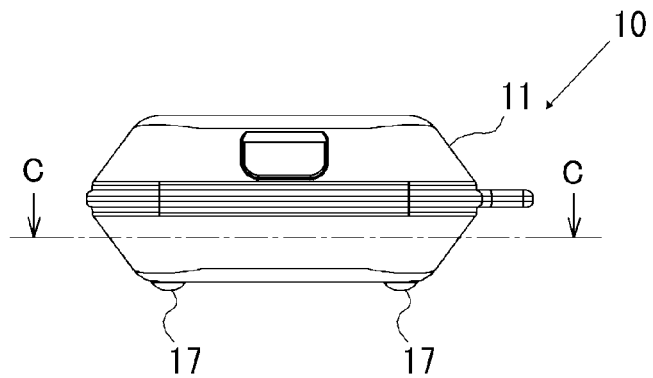
FIG. 2 is a front view illustrating the optical measuring device of FIG. 1.
Figure 3:
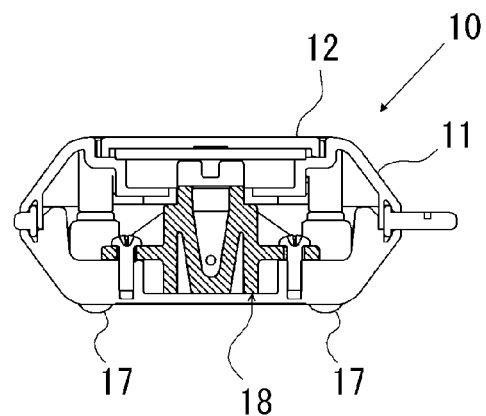
FIG. 3 is a cross-sectional view taken along line A-A in FIG. 1.
Figure 4:
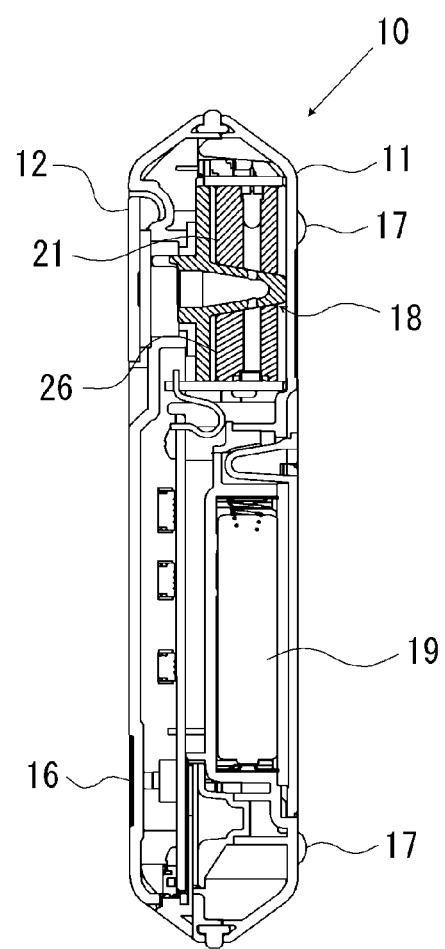
FIG. 4 is a cross-sectional view taken along line B-B in FIG. 1.
Figure 5:
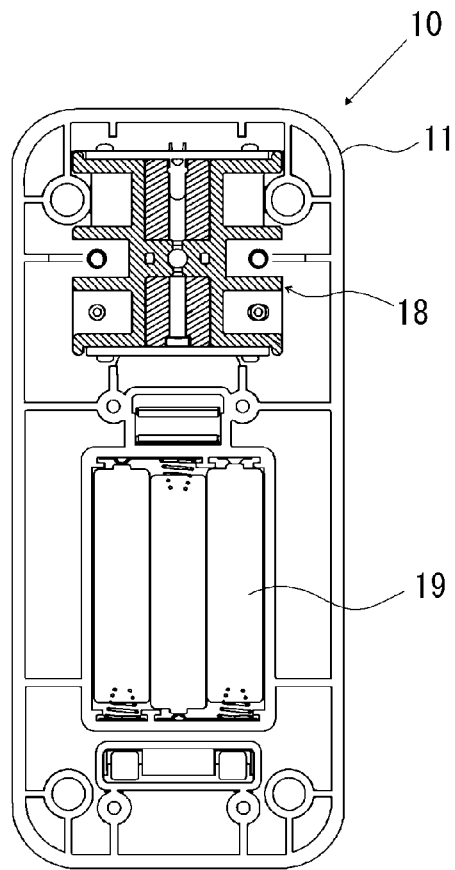
FIG. 5 is a cross-sectional view taken along line C-C in FIG. 2.
Figure 6:
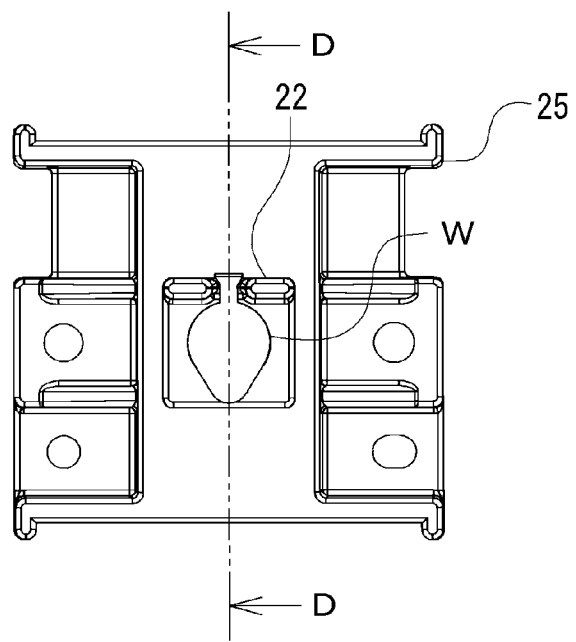
FIG. 6 is a plan view illustrating an optical measuring mechanism in the optical measuring device of FIG. 1 with a sample tube being attached thereto.
Figure 7:
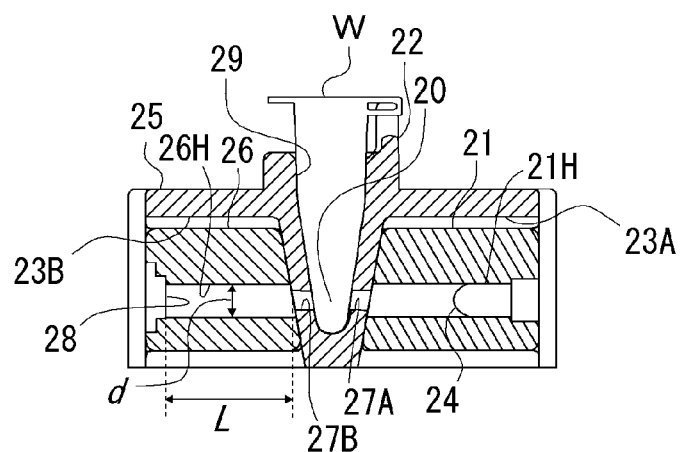
FIG. 7 is a cross-sectional view taken along line D-D in FIG. 6.

FIG. 1 is a plan view illustrating a configuration example of an optical measuring device of the present invention; FIG. 2 is a front view illustrating the optical measuring device of FIG. 1; FIG. 3 is a cross-sectional view taken along line A-A in FIG. 1; FIG. 4 is a cross-sectional view taken along line B-B in FIG. 1; FIG. 5 is a cross-sectional view taken along line C-C in FIG. 2; FIG. 6 is a plan view illustrating an optical measuring mechanism in the optical measuring device of FIG. 1 with a sample tube being attached thereto; and FIG. 7 is a cross-sectional view taken along line D-D in FIG. 6.

The optical measuring device 10 is used, for example, for measuring a concentration of a substance to be measured in a measurement sample, or the like, as absorbance. As examples of the substance to be measured, may be mentioned Escherichia coli, protein, DNA obtained by amplification by polymerase chain reaction (PCR) and pigment.

In the optical measuring device 10, an optical measuring mechanism 18 is provided in a region of the upper side (the upper side in FIG. 1) in a housing 11, and a battery chamber 19 for accommodating a drive battery is provided in a region of the lower side (the lower side in FIG. 1) in the housing 11. A single swing cover 12 for inserting and withdrawing a sample tube W therethrough is provided at a position corresponding to the optical measuring mechanism 18 on the upper surface side (the left surface side in FIG. 4) of the housing 11. An operation unit 16 in which a power button, etc., are disposed is provided in a region of a lower part (lower part in FIG. 1) of the upper surface side of the housing 11. Furthermore, support legs 17 for supporting the housing 11 on a horizontal support surface are provided in a protruding manner on the lower surface side (the right surface side in FIG. 4) of the housing 11.

The optical measuring mechanism 18 includes: a first light guiding path forming body 21 having therein a first light guiding path 21H that allows measurement light from a light source 24 to be incident on a measuring position 20 in which the sample tube W is disposed; and a second light guiding path forming body 26 having therein a second light guiding path 26H that guides detection light exiting from the measuring position 20 to a light receiving unit 28.

The first light guiding path 21H and the second light guiding path 26H are each formed by a cylindrical through hole extending linearly. The first light guiding path forming body 21 and the second light guiding path forming body 26 are disposed so that the first light guiding path 21H and the second light guiding path 26H are positioned coaxially with each other.

The light source 24 is held by being inserted into one end (the right end in FIG. 7) of the first light guiding path 21H not facing the second light guiding path 26H. The light receiving unit 28 is held by being inserted into one end (the left end in FIG. 7) of the second light guiding path 26H not facing the first light guiding path 21H coaxially with an optical axis of the light source 24.

The light source 24 held by being inserted into the first light guiding path 21H allows the optical axis of the light source 24 and an axis of the first light guiding path 21H to be easily set approximately in parallel with each other. Thus, a light flux can be distributed in a direction of the light receiving unit 28 with high efficiency.

A diameter of the first light guiding path 21H on the light source 24 side may be the same as, or may be different from, a diameter of the second light guiding path 26H on the light receiving unit 28 side. From the viewpoint of reducing unnecessary scattered light, reflected light and stray light, however, it is preferable that the diameter of the second light guiding path 26H on the light receiving unit 28 side is smaller than the diameter of the first light guiding path 21H on the light source 24 side.

The optical measuring mechanism 18 is provided with a sample bracket 25 having, at a central part of the sample bracket 25, a tapered sample tube receiving hole 29 with a smaller diameter toward its bottom part, into which the sample tube W having loaded a measurement sample is inserted. In the sample tube receiving hole 29, light passing holes 27A and 27B through which measurement light and detection light pass, respectively, are provided at positions opposed to each other in a lower side (the lower side in FIG. 7) region. In the sample bracket 25, accommodation recesses 23A and 23B are formed so as to extend linearly in a horizontal direction (the horizontal direction in FIG. 7) with the sample tube receiving hole 29 interposed therebetween and be communicated with the light passing holes 27A and 27B of the sample tube receiving hole 29. The first light guiding path forming body 21 and the second light guiding path forming body 26 are held by being pressed into the accommodation recesses 23A and 23B in such a manner that ends of the first light guiding path 21H and the second light guiding path 26H are opposed to, and communicated with, the light passing holes 27A and 27B, respectively.

The sample bracket 25 also includes a position confining member 22 provided so as to protrude from a front surface (the upper surface in FIG. 7) of the sample bracket 25 for confining the position of the sample tube W.

The sample tube receiving hole 29 can have a shape and a size corresponding to a PCR tube or a sample tube, for example, a sample tube of 1.5 mL or a sample tube of 2.0 mL.

A sample bracket made of a polycarbonate resin, for example, may be used as the sample bracket 25.

From the viewpoint of inhibiting the incidence of stray light from the outside, the sample bracket 25 preferably has a black color.

In the optical measuring device 10 of the present invention, the first light guiding path forming body 21 and the second light guiding path forming body 26 are formed from a light-absorbing material, preferably formed from a light-absorbing elastic body, in particular.

As an example of the light-absorbing elastic body, may be mentioned a silicone resin, such as polydimethylsiloxane (PDMS), having a light-absorbing substance dispersed therein. Such a silicone resin can be preferably employed as the light-absorbing elastic body according to the present invention, because the amount of autofluorescence (fluorescence produced by itself) by the silicone resin is small.

As an example of the light-absorbing substance, may be mentioned black powder. As examples of the black powder, may be mentioned carbon black and carbon nanotube.

The elastic body in which the light-absorbing substance is dispersed preferably has a refractive index of not lower than 1.3 and not more than 1.8.

A ratio L/d, wherein d represents a diameter of the second light guiding path 26H in the second light guiding path forming body 26 and L represents a length thereof, is preferably not lower than 3 and not more than 15, more preferably not lower than 3.3 and not more than 13.3.

When the ratio L/d between the diameter and length of the second light guiding path 26H is less than 3, there is a risk that scattered light other than the desired detection light cannot be sufficiently absorbed and thereby eliminated by a wall surface surrounding the second light guiding path 26H. When the ratio L/d between the diameter and length of the second light guiding path 26H is more than 15, on the other hand, the increased length L of the second light guiding path 26H may prevent sufficient downsizing of the optical measuring device. The reduced diameter d of the second light guiding path 26H requires increase in the amount of light in the light source 24. This requires increase in the capacity of a power source that provides current to the light source 24 and leads to increase in the size of the power source. Thus, there may be a case where the optical measuring device cannot be downsized sufficiently.

The diameter d of the second light guiding path 26H is 1.5 to 3 mm, for example.

The diameters of the first light guiding path 21H and the second light guiding path 26H are defined to be larger than the diameters of the light passing holes 27A and 27B of the sample bracket 25, respectively. The first light guiding path forming body 21 and the second light guiding path forming body 26 are held by being pressed into the sample bracket 25. Even when the first light guiding path forming body 21 and the second light guiding path forming body 26 are deformed due to the press fit, the larger diameters of the first light guiding path 21H and the second light guiding path 26H reliably allow the light passing holes 27A and 27B to be positioned within openings of the first light guiding path 21H and the second light guiding path 26H.

The length L of the second light guiding path 26H refers to a length of the second light guiding path 26H along the central axis thereof.

The length L of the second light guiding path 26H also varies depending on the thickness (thickness in the horizontal direction of FIG. 7) of the light passing hole 27B of the sample bracket 25. Specifically, the length from the sample tube W to the light receiving unit 28 along the optical axis is defined to be 10 to 20 mm.

An LED such as a white LED, for example, may be employed as the light source 24, and a photodiode such as an RGB color sensor, for example, may be employed as the light receiving unit 28. The use of the RGB color sensor as the light receiving unit 28 enables the measurements of absorbance in each of the wavelengths of RGB.

For example, a concentration of protein can be quantitated from the absorbance of light near a wavelength of 560 nm by the BCA method or from the absorbance of light near a wavelength of 600 to 700 nm by the Bradford method.

The optical measuring device 10 of the present invention may be provided with a heating mechanism for chemically or physically heat-treating a measurement sample in the sample tube W or for heating a measurement sample in the sample tube W in order to perform optical measurement under constant temperature conditions.

The heating mechanism may be configured to heat the sample tube W from the upper and lower sides thereof. Specifically, the heating mechanism may include: an upper heater member provided on a back surface side of the cover 12 of the housing 11 and disposed so as to be brought into contact with an upper surface of the sample tube W by being pressed by the sample tube W when the cover 12 is closed; and a lower heater member disposed so as to be in contact with a lower surface of the sample tube W protruded from an opening passing through a lower part of the sample tube receiving hole 29.

A sheet heater having a pattern may be employed as each of the upper heater member and the lower heater member.

When the heating mechanism is provided to the optical measuring device 10 of the present invention, it is preferable that a cooling fan for rapidly cooling the heated sample tube W with circulating cooling air is further provided.

As an example of dimensions of the elements of the optical measuring device 10, the housing 11 has a vertical width (length in the vertical direction of FIG. 1) of 150 mm, a horizontal width (length in the horizontal direction of FIG. 1) of 70 mm, a height (length in a direction perpendicular to the plane of paper in FIG. 1) of 30 mm and a weight of 300 g. In the second light guiding path 26H, the diameter d is $\phi$3.0 mm, the length L in the optical axis direction is 11.2 mm, and a distance from a wall surface of the sample tube W to a front surface of the light receiving unit 28 is 12.8 mm. The diameter of the light passing hole 27B of the sample tube receiving hole 29 in the sample bracket 25 is $\phi$1.7 mm, and the sample tube receiving hole 29 has a diameter of $\phi$1.7 mm at the minimum portion thereof and a diameter of $\phi$3.0 mm at the maximum portion thereof. Furthermore, the distance between the light source 24 and the light receiving unit 28 is 35 mm.

Optical measurement by the optical measuring device 10 is performed as follows. More specifically, a liquid measurement sample in the sample tube W received by the sample tube receiving hole 29 in the measuring position 20 is irradiated with measurement light emitted from the light source 24 in the optical measuring mechanism 18. The measurement light irradiated onto the measurement sample in the sample tube W is absorbed according to the concentration of the substance to be measured. Of light having transmitted through and exited from the sample tube W without being absorbed, scattered light other than the desired detection light is absorbed and thereby eliminated by the wall surface surrounding the second light guiding path 26H. Thus, only the detection light reaches the light receiving unit 28, and the amount of the light is measured to obtain absorbance and calculate the concentration. Specifically, when the light transmits through the measurement sample, the transmittance thereof exponentially attenuates with respect to an optical path length according to the concentration of the substance to be measured. Therefore, a calibration curve is produced in advance by measuring a standard solution of the substance to be measured at a known concentration as a reference sample. By comparing to its light amount, the concentration can be calculated from the absorbance of the substance to be measured in the measurement sample.

The optical measuring device 10 described above can be downsized by disposing the light source 24 and the light receiving unit 28 close to each other, and thus the optical measuring device 10 can be carried readily. Furthermore, since the second light guiding path forming body 26 is formed from a light-absorbing material according to the optical measuring device 10, scattered light other than the desired detection light is absorbed by the wall surface surrounding the second light guiding path 26H. Thus, the reflection and scattering of such light can be suppressed. Consequently, the optical measuring device 10 of the present invention enables the light receiving unit 28 to be irradiated only with the detection light. Thus, measurement results with high accuracy can be obtained.

While the embodiment of the present invention has been described above, the present invention is not limited to the aforementioned embodiment, and various modifications can be made thereto.

For example, the sample bracket is not an essential component. The optical measuring device may be configured so that the sample tube is directly inserted into or withdrawn from the light guiding path forming body. When the light guiding path forming body is formed by an elastic body, however, it may be difficult to insert or withdraw the sample tube due to large friction between the elastic body and the sample tube made of polypropylene. Therefore, it is preferable that the sample bracket is provided in the optical measuring device of the present invention.

REFERENCE SIGNS LIST 10 optical measuring device
11 housing
12 cover
16 operation unit
17 support leg
18 optical measuring mechanism
19 battery chamber
20 measuring position
21 first light guiding path forming body
21H first light guiding path
22 position confining member
23A, 23B accommodation recess
24 light source
25 sample bracket
26 second light guiding path forming body
26H second light guiding path
27A, 27B light passing hole
28 light receiving unit
29 sample tube receiving hole
W sample tube

The invention claimed is:

1. An optical measuring device comprising:
a first light guiding path forming body having therein a first light guiding path formed by a through hole extending linearly for allowing measurement light from a light source to be incident on a measuring position in which a measurement sample is disposed; and
a second light guiding path forming body having therein a second light guiding path formed by a through hole extending linearly for guiding detection light having exited from the measuring position to a light receiving unit,
wherein, in the measuring position, the measurement light is incident and the detection light is exited through a sample bracket having a sample tube receiving hole into which the sample tube loaded with the measurement sample is inserted,
the second light guiding path forming body is formed from a light-absorbing material,
all of the second light guiding path is surrounded by an inner wall surface of the through hole in the second light guiding path forming body,
wherein a relational expression (1) described below is satisfied when d represents a diameter of the second light guiding path of the second light guiding path forming body and L represents a length of the second light guiding path of the second light guiding path forming body:

$3 \leq L/d \leq 15$, Relational expression (1):

wherein the second light guiding path of the second light guiding path forming body is positioned coaxially with the first light guiding path of the first light guiding path forming body.

2. The optical measuring device according to claim 1, wherein the light-absorbing material is a light-absorbing elastic body.

3. The optical measuring device according to claim 2, wherein the light-absorbing elastic body is a silicone resin having a light-absorbing substance dispersed therein.

4. The optical measuring device according to claim 2, wherein an accommodation recesses for accommodating the first light guiding path forming body and the second light guiding path forming body are formed in the sample bracket, and the first light guiding path forming body and the second light guiding path forming body are held by being pressed into the accommodation recesses, respectively.

5. The optical measuring device according to claim 1, wherein the first light guiding path forming body is formed from a light-absorbing material.

* * * * *